US009616812B2

(12) United States Patent
Sawayanagi (10) Patent No.: US 9,616,812 B2
(45) Date of Patent: Apr. 11, 2017

(54) LIGHT EMISSION STRUCTURE FOR INDICATION SYMBOL IN INTERIOR SPACE OF VEHICLE

(75) Inventor: Masahiro Sawayanagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/926,873

(22) Filed: Dec. 15, 2010

(65) Prior Publication Data

US 2011/0180728 A1 Jul. 28, 2011

(30) Foreign Application Priority Data

Jan. 28, 2010 (JP) ................................. 2010-016335

(51) Int. Cl.
*B60Q 3/04* (2006.01)
*B60Q 3/00* (2017.01)

(52) U.S. Cl.
CPC ............ *B60Q 3/042* (2013.01); *B60Q 3/008* (2013.01); *B60Q 3/048* (2013.01)

(58) Field of Classification Search
CPC ........ G01N 21/00; G01N 21/33; G01N 21/64; G01N 21/645; G01N 21/6489; G01N 21/66
USPC ............................................. 250/365, 461.1
See application file for complete search history.

(56) References Cited

U.S. PATENT DOCUMENTS 4,956,580 A * 9/1990 Yun-Shang ...................... 315/83
5,410,453 A * 4/1995 Ruskouski ........... G02B 6/0023
257/E25.028
6,211,526 B1 * 4/2001 Huston et al. ............. 250/484.4
6,282,825 B1 * 9/2001 Godfrey .................... G09F 7/12
40/574
6,412,971 B1 * 7/2002 Wojnarowski et al. ...... 362/241
6,499,852 B1 * 12/2002 Kino ....................... B60K 37/02
362/23.1
6,603,243 B2 * 8/2003 Parkyn ..................... G09F 9/33
313/113
6,762,741 B2 * 7/2004 Weindorf ...................... 345/102
(Continued)

FOREIGN PATENT DOCUMENTS

DE 19853378 A1 6/2000
DE 69520728 T2 11/2001
JP 2005-017039 A 1/2005

OTHER PUBLICATIONS

Chinese Office Action mailed on Jan. 22, 2013, issued in Chinese Patent Application No. CN201110022017.3.
(Continued)

*Primary Examiner* — David Porta
*Assistant Examiner* — Djura Malevic
(74) *Attorney, Agent, or Firm* — Locke Lord LLP (57) ABSTRACT

An interior space of an automobile includes a maplamp unit and a plurality of functional units. The maplamp unit is provided on a ceiling of the interior space and is adapted to emit an ultraviolet light therefrom toward and upon a predetermined area of irradiation by the ultraviolet light. The functional units are spaced from each other and yet provided such that they all reside within the irradiation area. The functional units may include a combination meter, a navigation device, an air conditioner operating area, a power window switch area, and a small article placing area. These functional units each include at least one luminescent symbol. The luminescent symbol is adapted to become luminous when irradiated by the ultraviolet light emitted by the maplamp unit.

5 Claims, 10 Drawing Sheets

(56) References Cited

U.S. PATENT DOCUMENTS

| | | | |
|---|---|---|---|
| 6,883,926 B2* | 4/2005 | Wojnarowski | 362/84 |
| 7,153,013 B2* | 12/2006 | Pederson | B60Q 1/2611 |
| | | | 340/471 |
| 7,276,854 B1* | 10/2007 | Deutsch et al. | 315/77 |
| 8,016,465 B2* | 9/2011 | Egerer et al. | 362/489 |
| 8,162,519 B2* | 4/2012 | Salter et al. | 362/488 |
| 8,475,017 B2* | 7/2013 | Salter et al. | 362/490 |
| 8,506,141 B2* | 8/2013 | Cannon et al. | 362/490 |
| 8,884,786 B2* | 11/2014 | Beukema | G09F 13/04 |
| | | | 340/815.4 |
| 2002/0145879 A1 | 10/2002 | Yamanaka | |
| 2002/0176245 A1* | 11/2002 | Fuwausa et al. | 362/84 |
| 2004/0069931 A1* | 4/2004 | Stam et al. | 250/208.1 |
| 2004/0085752 A1* | 5/2004 | Fuwausa et al. | 362/84 |
| 2004/0097195 A1* | 5/2004 | Selleck | G06F 3/1423 |
| | | | 455/41.3 |
| 2004/0189483 A1 | 9/2004 | Stringfellow | |
| 2005/0128751 A1* | 6/2005 | Roberge | F21K 9/00 |
| | | | 362/276 |
| 2006/0022214 A1* | 2/2006 | Morgan et al. | 257/99 |
| 2006/0259232 A1* | 11/2006 | Huthoefer | G08G 5/065 |
| | | | 701/120 |
| 2007/0040512 A1* | 2/2007 | Jungwirth | H05B 33/086 |
| | | | 315/159 |
| 2008/0074895 A1* | 3/2008 | Halbweiss et al. | 362/490 |
| 2008/0087797 A1* | 4/2008 | Turnbull et al. | 250/206.1 |
| 2008/0129923 A1* | 6/2008 | Hu | G02F 1/13336 |
| | | | 349/64 |
| 2008/0210870 A1* | 9/2008 | Remillard et al. | 250/330 |
| 2009/0129107 A1* | 5/2009 | Egerer et al. | 362/509 |
| 2009/0289175 A1* | 11/2009 | Mahowald et al. | 250/216 |
| 2010/0084575 A1* | 4/2010 | Wilson et al. | 250/492.1 |

OTHER PUBLICATIONS

Chinese Office Action mailed on Jul. 30, 2013, issued in Chinese Patent Application No. 201110022017.3.

Office Action dated May 21, 2015 issued for corresponding German Patent Application No. 10 2011 002 430.1.

* cited by examiner

(b) MEDIUM BRIGHTNESS (c) HIGH BRIGHTNESS (d) LOW BRIGHTNESS

FIG. 12

LIGHT EMISSION STRUCTURE FOR INDICATION SYMBOL IN INTERIOR SPACE OF VEHICLE

CROSS-REFERENCE TO RELATED APPLICATION

This application claims priority to the Japanese Patent Application No. 2010-016335 filed on Jan. 28, 2010, the disclosure of which is incorporated herein by reference in its entirety.

BACKGROUND OF THE INVENTION

1. Field of the Invention

The present invention relates to a light emission or luminescence structure for an indication symbol provided in an interior space of an automobile or other vehicle.

2. Background Art

Conventional meter devices such as a speedometer incorporated in an instrument panel of an automobile or other vehicle include (a) a dial having a light-transmissive indication symbol such as numerical values, scale marks and any other iconographic symbols or signs and (b) a light source adapted to illuminate the dial from a back side thereof.

In the conventional meter devices of this kind, a light is emitted from the light source toward the dial in response to turning on of the automobile's headlight or road light, the light passing through the light-transmissive indication symbol of the dial so that the light-transmissive indication symbol emits light.

In addition to the meter device, the instrument panel may include various types of on-board devices such as a car navigation system, a car audio system, and an air conditioner operating area. In the same manner as in the case of the meter device, these on-board devices may include a light-transmissive indication symbol and a light source adapted to make the light-transmissive indication symbol emit light.

Another exemplary conventional meter device is disclosed for example in Japanese Patent Application Laid-Open Publication No. 2005-17039. This conventional meter device comprises a dial (indication part) that includes on its front surface a fluorescent indication symbol made of fluorescent material, the fluorescent indication symbol including numerical values and scale marks made of the fluorescent material; and a light source (ultraviolet LED) that emits an ultraviolet light toward and upon the front surface of the dial, wherein the indication symbol of the dial becomes luminous when irradiated by the ultraviolet light emitted by the light source.

In this manner, the meter device and the on-board devices that are provided in the instrument panel are adapted to make the indication symbol emit light or become luminous so as to enhance the visibility and aesthetic appearance of the indication symbol during nighttime hours or in a dark place.

Since the above-described meter device and the various types of on-board devices are independently provided and spaced from each other, it is necessary to individually provide the light sources on a per-on-board-device basis for light emission or luminescence of the individually-provided indication symbols, which necessarily increases the number of components, complexity of wiring connections, and the manufacturing costs.

Also, a functional unit that emits light may have to be provided in an operating switch of a power window switch area provided in the interior panel of the vehicle door. Further, a light-emitting or luminescent decoration symbols may have to be provided in a center console provided between a driving seat and a front passenger seat. In such cases that involve design changes that necessitates incorporation of additional light-emitting or luminescent symbols for increasing the operability and aesthetic appearance of the various types of devices provided in the automotive interior space, a larger number of light sources may have to be provided, which further increases the number of light sources and the components and the complexity of the wiring connections, which further makes it difficult to readily provide the additional light-emitting or luminescent symbols.

In view of the drawbacks found in the above-described prior art, the purpose of the present invention is to provide a light-emission or luminescence structure for the indication symbols in an automotive interior space that allows readily incorporation of additional light-emitting or luminescent symbols with a reduced number of the light sources.

SUMMARY OF THE INVENTION

In order to attain the above object, the invention described in claim 1 is a light emission structure for an indication symbol provided in an interior space of a vehicle, comprising: (a) an ultraviolet light source adapted to emit an ultraviolet light from a ceiling of the interior space toward and upon an irradiation area, wherein the irradiation area is a predetermined area to be irradiated by the ultraviolet light; and (b) a plurality of functional units provided within the irradiation area and spaced from each other, the functional units each including a luminescent symbol configured to become luminous by being irradiated by the ultraviolet light.

With the construction and arrangement described above, when the ultraviolet light source emits the ultraviolet light upon the predetermined irradiation area, then the luminescent symbols belonging to the functional units that fall within the irradiation area are irradiated by the ultraviolet light to become luminous, Accordingly, it is not necessary to individually provide the light sources on a per-functional unit basis. Further, one single ultraviolet light sources only has to be provided for luminescence of the indication symbols of the multiple functional units, which contributes to reduction of the number of the light sources.

Another advantageous effect of the present invention is that a luminescent symbol of the additionally provided functional unit can become luminous simply by providing the functional unit such that it resides within the irradiation area to be irradiated by the ultraviolet light source, which allows the luminescent symbols to be readily added.

Also, since the functional units are provided within the irradiation area irradiated by the ultraviolet light from the ceiling part, i.e., within the range viewable from the ceiling part, it is possible to prevent an obstacle from intervening the irradiation of the ultraviolet light upon the functional unit.

Further, since the luminescent symbol becomes luminous when being irradiated by the ultraviolet light, it does not emit light with a high brightness that a driver or a passenger may feel it too bright, so that discomfort of the driver and the passenger can be avoided.

Yet another advantageous effect is that since the ultraviolet light is emitted from the ceiling part, it is possible to prevent the ultraviolet light from being emitted directly upon the eyes of the driver or the passenger.

Preferably, the ultraviolet light source includes light-control functionality for controlling an irradiation intensity of the ultraviolet light.

With this configuration, it is possible to uniformly control the brightness of the luminescent symbols of the functional units provided in the automotive or vehicular interior space, and accordingly it is not necessary to individually control the brightness of the luminescent symbols on a per-functional unit basis, which significantly facilitates the brightness control.

The foregoing and other aspects and advantages of the invention will appear from the following description with reference made to the accompanying drawings which form a part thereof, in which there is shown by way of illustration an exemplary embodiment of the present invention. Such an exemplary embodiment does not necessarily represent the full scope of the present invention, and reference is to be made to the claims and herein for interpreting the scope of the invention.

BRIEF DESCRIPTION OF THE DRAWINGS

The present invention is described in a preferred embodiment in the following description with reference to the drawings, in which like numbers represent the same or similar elements, as follows.

DESCRIPTION OF THE EXEMPLARY EMBODIMENT

Figure 1:
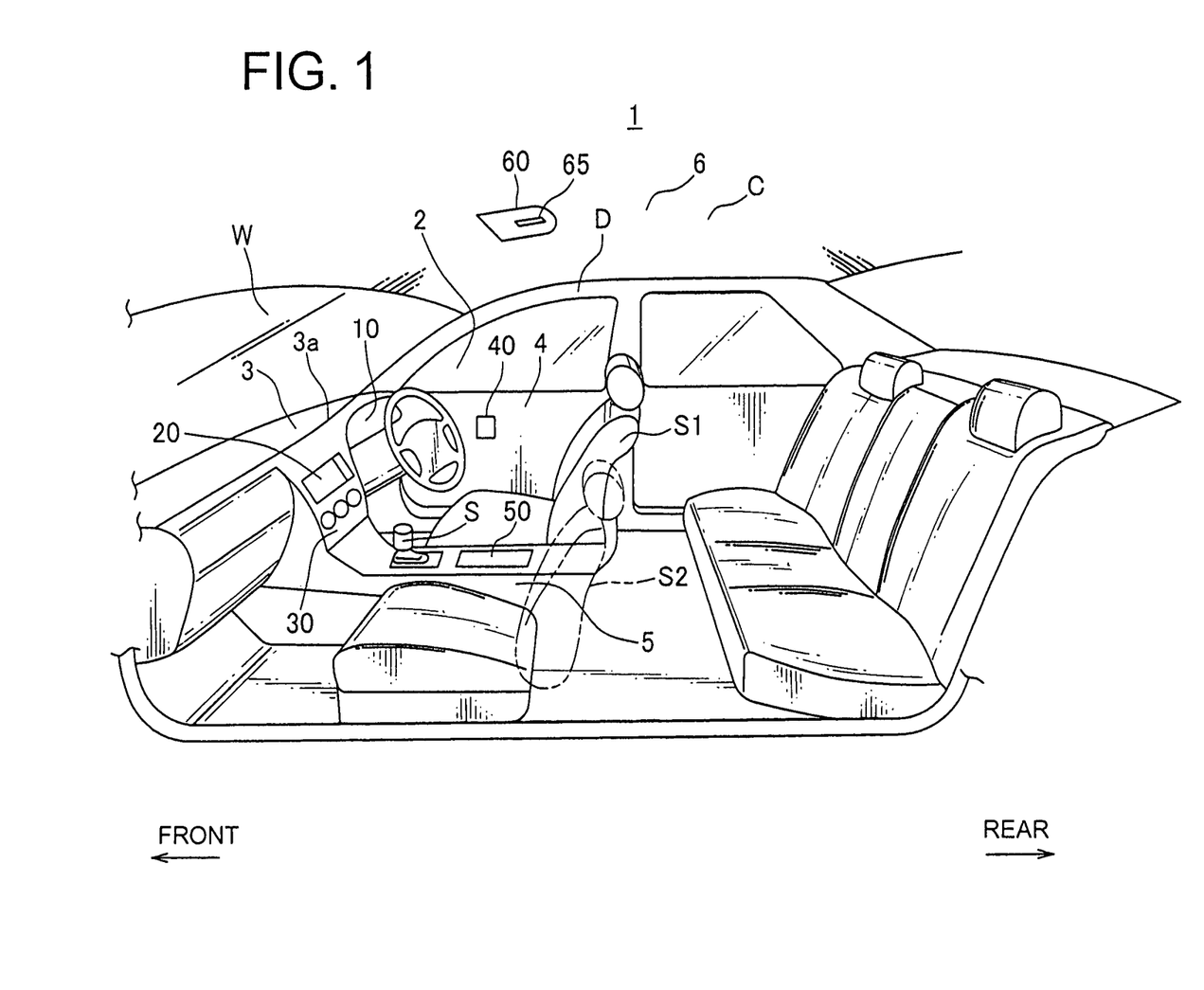
FIG. 1 is a perspective view of an interior space of an automobile with a light emission structure for an indication symbol according to one embodiment of the present invention.

With reference made to FIGS. 1 through to 12, the following describes an interior of an automobile with a light emission structure (or luminescence structure) for an indication symbol according to one embodiment of the present invention, the indication symbol being provided in the interior space of the automobile.

Referring to FIG. 1, there are shown an automotive interior space 2 in an automobile 1 (which is a "vehicle" in the context of the scope of the invention).

A driver-side door D includes a door interior panel 4 on its surface defining the interior space 2. Other doors of the automobile 1 may each include a door interior panel of the same or similar configuration.

A roof interior panel 6 is provided on a surface of a ceiling C defining the interior space 2.

An instrument panel 3 and a center console 5 are provided in the interior space 2.

The instrument panel 3 is arranged in a space below a windshield glass W provided in a front side of the automobile 1. The instrument panel 3 includes a combination meter 10 on its front portion facing a driving seat S1.

A navigation device 20 and an air conditioner operating area 30A are provided in a central portion of the combination meter 10 between the driving seat S1 and a front passenger seat S2.

Figure 2:
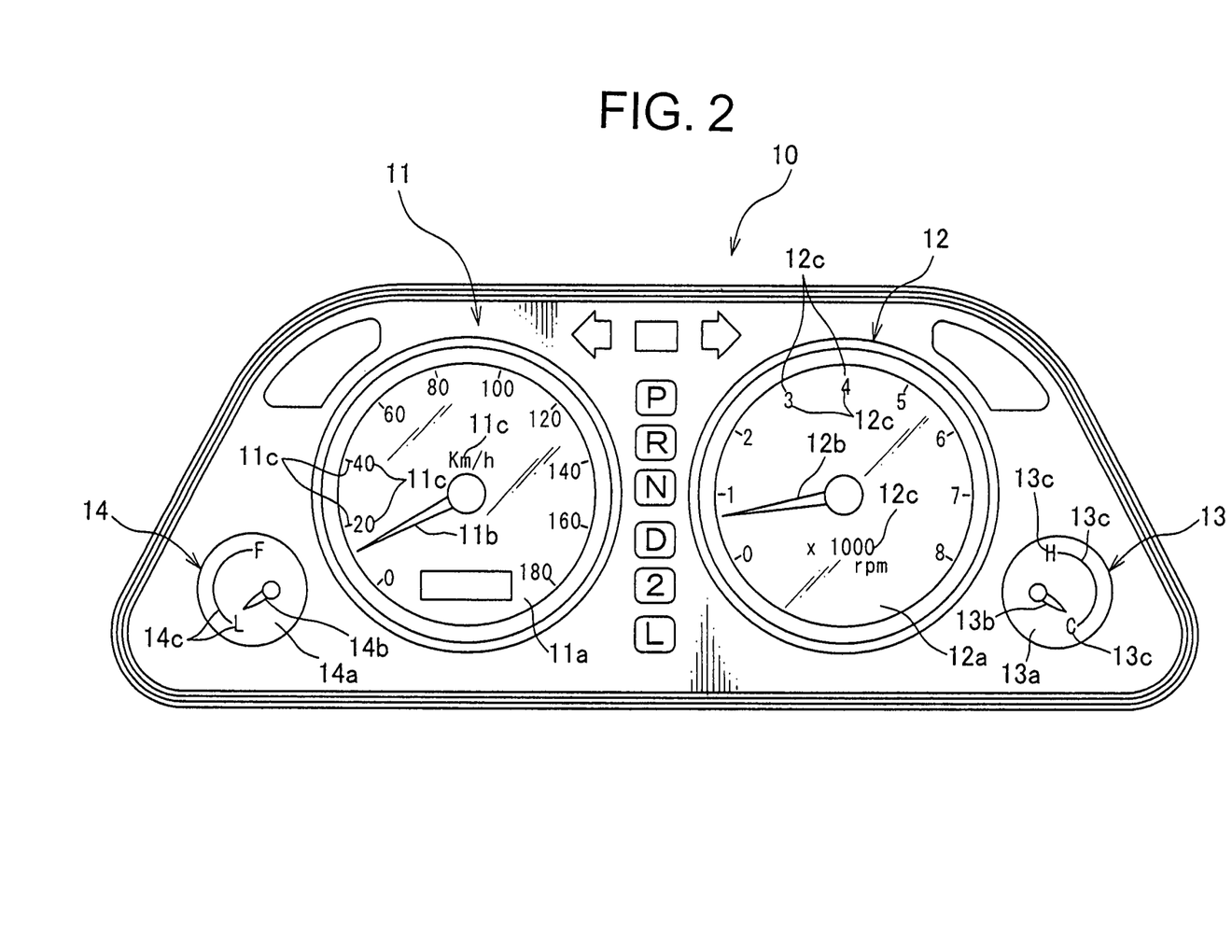
FIG. 2 is a front view of a combination meter illustrated in FIG. 1.

Referring to FIG. 2, the combination meter 10 includes a speedometer 11, a tachometer 12, a water temperature meter 13, and a fuel meter 14, which are generically referred to as a "meter device."

The speedometer 11 includes a dial 11a with indicating symbols 11c provided on its front surface, wherein the indicating symbols 11c includes, but not limited to, figures adapted to be pointed by an indicator needle 11b to indicate numerical values measured by a not-shown velocity sensor provided in the automobile 1, scale marks corresponding to the figures, and a unit for the numerical values. The tachometer 12, the water temperature meter 13, and the fuel meter 14 each have the same or similar configuration as that of the speedometer 11: Dials 12a, 13a, and 14a each provided therein include symbols 12c, 13c, and 14c, respectively.

The navigation device 20 may be a known device that is configured to display a map image of a location where the automobile 1 is currently running for a driver of the automobile 1 and display a current position and a moving direction of the automobile 1 upon the map image in a superimposed manner. The navigation device 20 is embedded in the instrument panel 3 with its front surface, i.e., a display operating area 21 oriented toward the automotive interior space 2.

Figure 3:
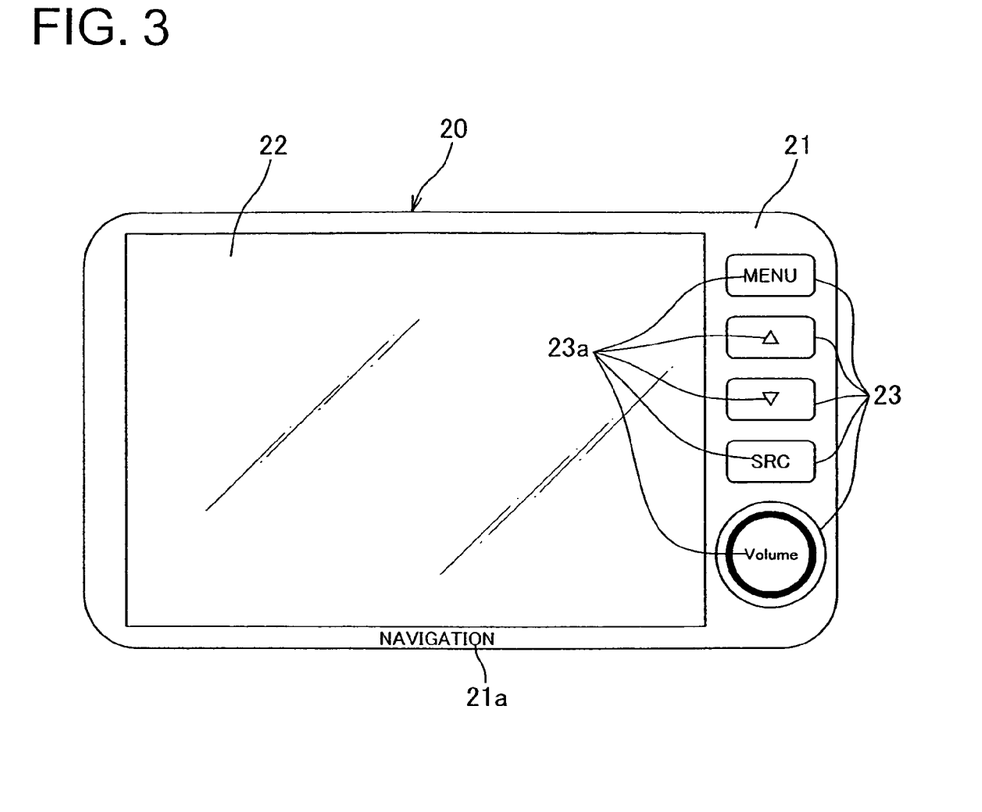
FIG. 3 is a front view of a navigation device illustrated in FIG. 1.

Referring to FIG. 3, the display operating area 21 includes a liquid crystal display (LCD) device 22 and a plurality of operating switches 23.

The map image, a mark indicative of the current position of the automobile 1, and a function select menu may be displayed in the LCD device 22.

The operating switches 23 may include, but not limited to, a menu button for displaying the function select menu of the navigation device 20; move buttons for selecting specific items of the function select menu; and an input source switching button for selecting and switching input sources of images to be displayed in the LCD device 22 (for example, a map image, a television image, and a DVD image). These switches are push-button switches. Also, the operating switches 23 may include a volume control knob comprising a rotary switch.

The operating switches 23 are aligned in one row heightwise of the display operating area 21 and along a lateral edge thereof. The operating switches 23 may each have a navigation function symbol 23a indicative of the function of these switches. Also, a navigation decoration symbol. 21a is provided at a lower end of the operating area 21 the navigation decoration symbol 21a being indicative of the device name.

The air conditioner operating area 30 is a functional unit dedicated to inputting of operations directed to an air conditioner device provided in the automobile 1. The air conditioner operating area 30 is provided below the navigation device 20 in the central portion of the instrument panel 3.

Figure 4:
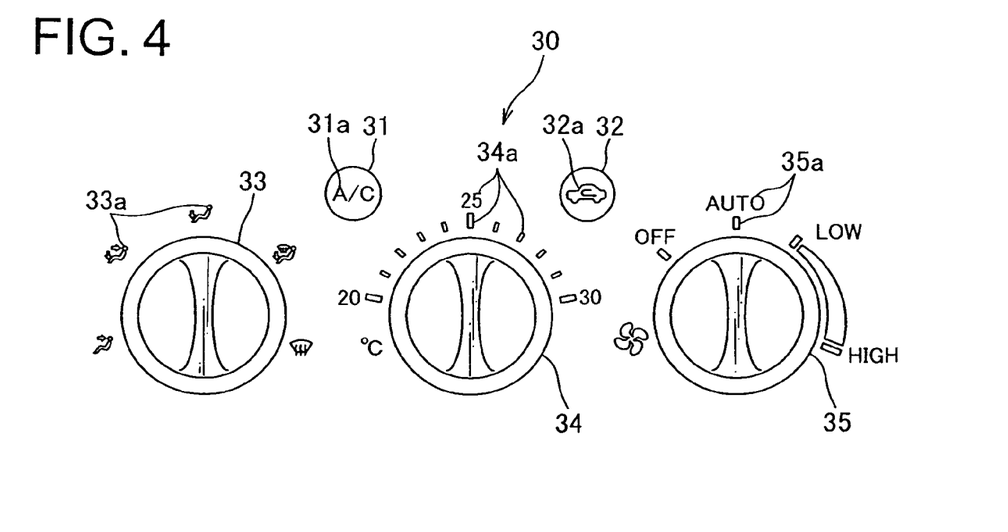
FIG. 4 is a front view of an air conditioner operating area illustrated in FIG. 1.

Referring to FIG. 4, the air conditioner operating area 30 may include an ON/OFF button 31 used to turn on and off the air conditioner device, the ON/OFF button 31 comprising a push-button switch; an air circulation switching button 32 for changing air circulation in the automotive interior space 2; an air outlet switching knob 33, a temperature control knob 34, and an air volume control knob 35, the switches 33, 34, 35 comprising a rotary switch. The buttons 31, 32 each include an air conditioner function symbol 31a, 32a representing the functionality of the button. Also, air conditioner function symbols 33a, 34a, 35a are provided around the corresponding knobs 33, 34, 35 to represent functions or interior space's temperatures selected by these knobs.

Figure 5:
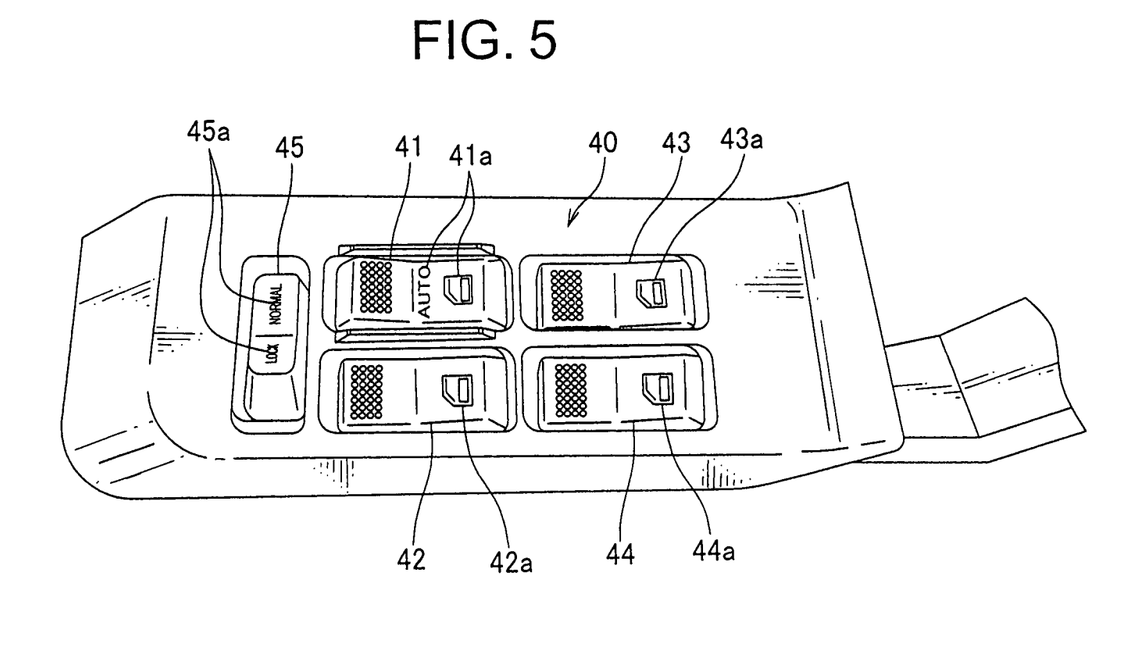
FIG. 5 is a perspective view of a power window switch area illustrated FIG. 1.

Referring to FIG. 5, the door interior panel 4 includes a power window switch area 40 used to control opening and closing of the window glasses each provided in corresponding each of the doors of the automobile 1. The power window switch area 40 comprises four control switches 41 to 44 dedicated to corresponding each of the window glasses, the control switches 41 to 44 each comprising a seesaw switch; and a lock switch 45 adapted to disable other power window switch areas provided in the doors other than the driver-side door D. Each of the switches 41 to 45 includes corresponding power window function symbols 41a to 45a that represent functionality of the switches.

The following four items, i.e., (1) the indicating symbols 11c to 14c provided in the combination meter 10, (2) the navigation decoration symbol 21a and the navigation function symbol 23a provided in the navigation device 20, (3) the air conditioner function symbols 31a to 35a provided in air conditioner operating area 30, and (4) the power window function symbols 41a to 45a provided in the power window switch area 40 may be made by a bright-colored normal ink provided on a dark-colored base with a fluorescent ink overlappingly applied upon the normal ink, the fluorescent ink being adapted to become luminous (glow, or emit light) when irradiated by an ultraviolet light. If the fluorescent ink is sufficiently viewable even under the visible light irradiation, the above items (1) to (4) may be made solely by the fluorescent ink.

The above-described items (1) to (4) are generically referred to as "luminescent symbol" in the context of the scope of the present invention. In addition, the combination meter 10, the navigation device 20, the air conditioner operating area 30, and the power window switch area 40 are generically referred to as "functional unit" in the context of the scope of the present invention.

Figure 6:
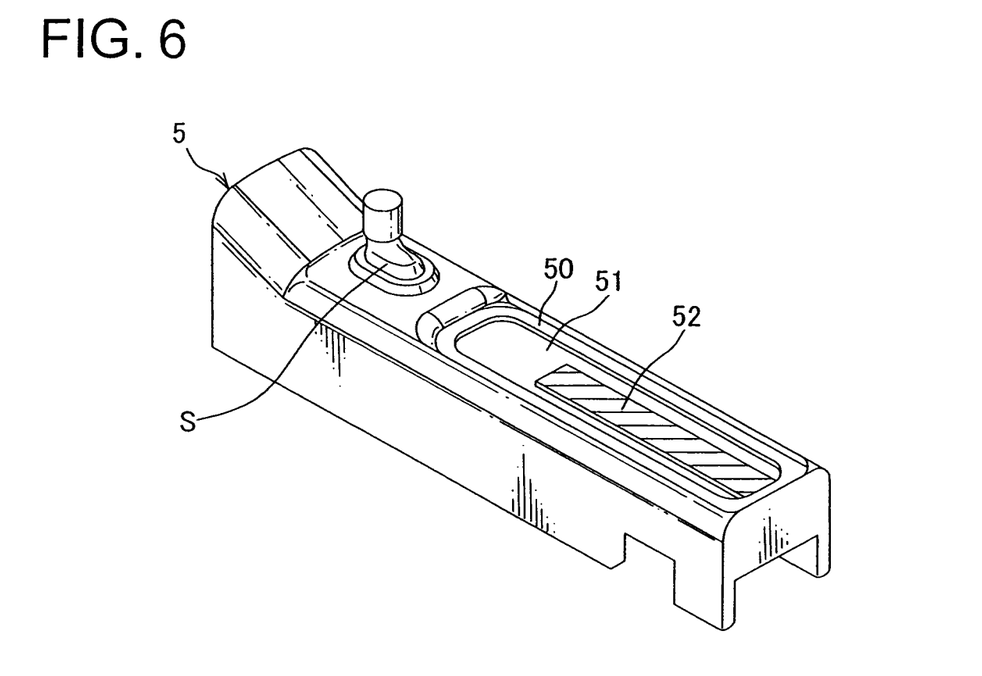
FIG. 6 is a perspective view of a center console illustrated in FIG. 1.

Referring to FIG. 6, an end of the center console 5 continues to the central portion of the instrument panel 3. The center console 5 is a substantially cylindrical portion that passes between the driving seat S1 and the front passenger seat S2 and extends toward a space where seat backs of the seats S1, S2 reside.

The center console 5 includes, in order of appearance starting from the side of the instrument panel 3, a gearshift S for shifting gears of a transmission provided in the automobile 1; and a small article placing area 50 for placing a small object.

The small article placing area 50 is a portion formed by making the top surface of the center console 5 depressed to take a shape of a tray with four rounded corners. A strip-like decoration plate 52 is provided on a bottom surface 51 of the small article placing area 50.

Figure 7:
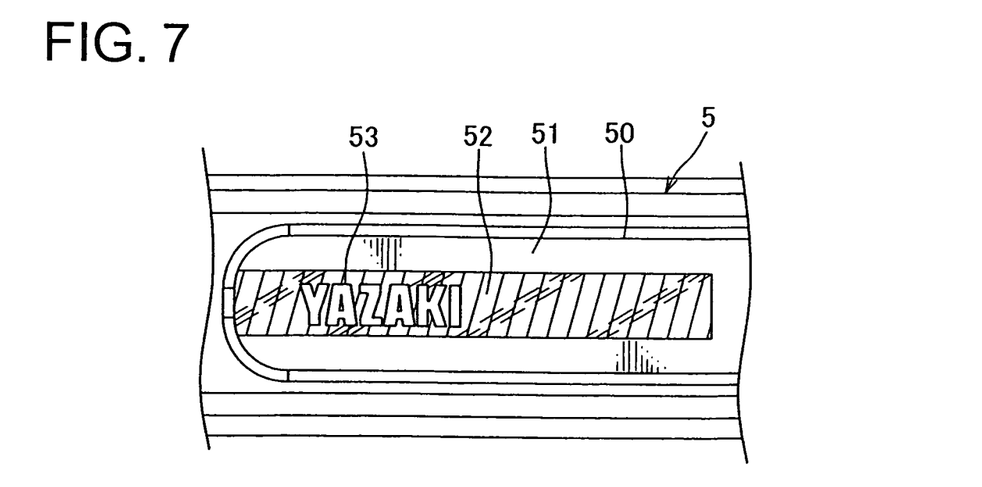
FIG. 7 is a front view of a small article placing area provided in the center console illustrated in FIG. 6 (illustrated in a state where an ultraviolet light is emitted)

Referring to FIG. 7, the decoration plate 52 includes a console decoration symbol 53. The console decoration symbol 53 is made of fluorescent ink that is not viewable under the visible light irradiation but becomes luminous and viewable when irradiated by the ultraviolet light. The console decoration symbol 53 may also be the luminescent symbol in the context of the scope of the present invention, and the small article placing area 50 may also be the functional unit in the context of the scope of the present invention.

Figure 8:
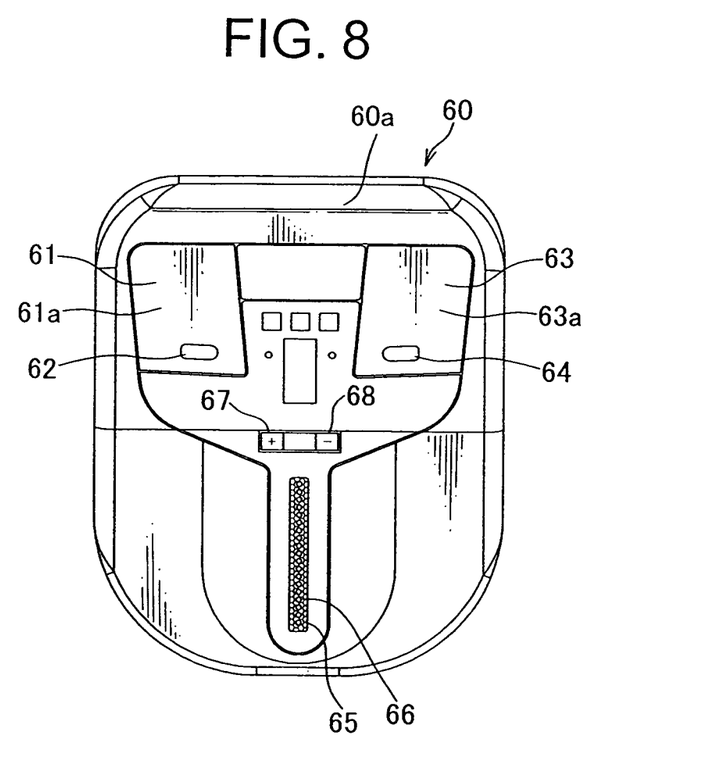
FIG. 8 is a front view of a maplamp unit illustrated in FIG. 1.

Referring to FIG. 8, a maplamp unit 60 is provided at the center of the roof interior panel 6. The maplamp unit 60 comprises a dome-like front cover 60a having a substantially elliptical shape in plan view. The front cover 60a includes a driver-side light-emitting part 61; a driver-side luminescent switch 62; a front-passenger-side light-emitting part 63; a front-passenger-side luminescent switch 64; an ultraviolet light-emitting part 65, and brightness control switches 67, 68.

The light-emitting part 61 is adapted to emit light so that hands of the driver sitting on the driving seat S1 is illuminated. The light-emitting part 61 includes a not-shown lamp and a cover 61a covering the lamp and made of translucent resin. The light-emitting part 61 is turned on and off in response to operation of the luminescent switch 62.

Likewise, the light-emitting part 63 is adapted to emit light so that hands of the passenger sitting on the front passenger seat S2 are illuminated. The light-emitting part 63 includes a not-shown lamp and a cover 63a covering the lamp and made of translucent resin. The light-emitting part 63 is turned on and off in response to operation of the luminescent switch 64.

The driver-side light-emitting part 61 and the front-passenger-side light-emitting part 63 are provided in a front end of the front cover 60a (shown in the upper region in FIG. 8).

The ultraviolet emitting part 65 includes a not-shown ultraviolet LED adapted to emit the ultraviolet light having a predetermined wavelength, and a light-guiding area 66 that covers the ultraviolet LED and pass the ultraviolet light irradiated by the ultraviolet LED.

The ultraviolet emitting part 65 is formed in a shape of a strip extending from a central portion of the front cover 60a toward a rear end (shown in the lower region in FIG. 8).

The ultraviolet light emitted by the ultraviolet LED may be any type of ultraviolet lights as long as it allows the aforementioned fluorescent ink to become luminous. For example, the ultraviolet LED may emit the ultraviolet light having a wavelength in the order of 380 nm to 400 nm.

The ultraviolet LED is adapted to emit the ultraviolet light in response to turning on of a headlight or a road light (these are hereafter simply referred to as "headlight") of the automobile 1.

Alternatively, in place of the ultraviolet LED, a black light tube may be used that irradiates an ultraviolet light having a predetermined wavelength.

Figure 9:
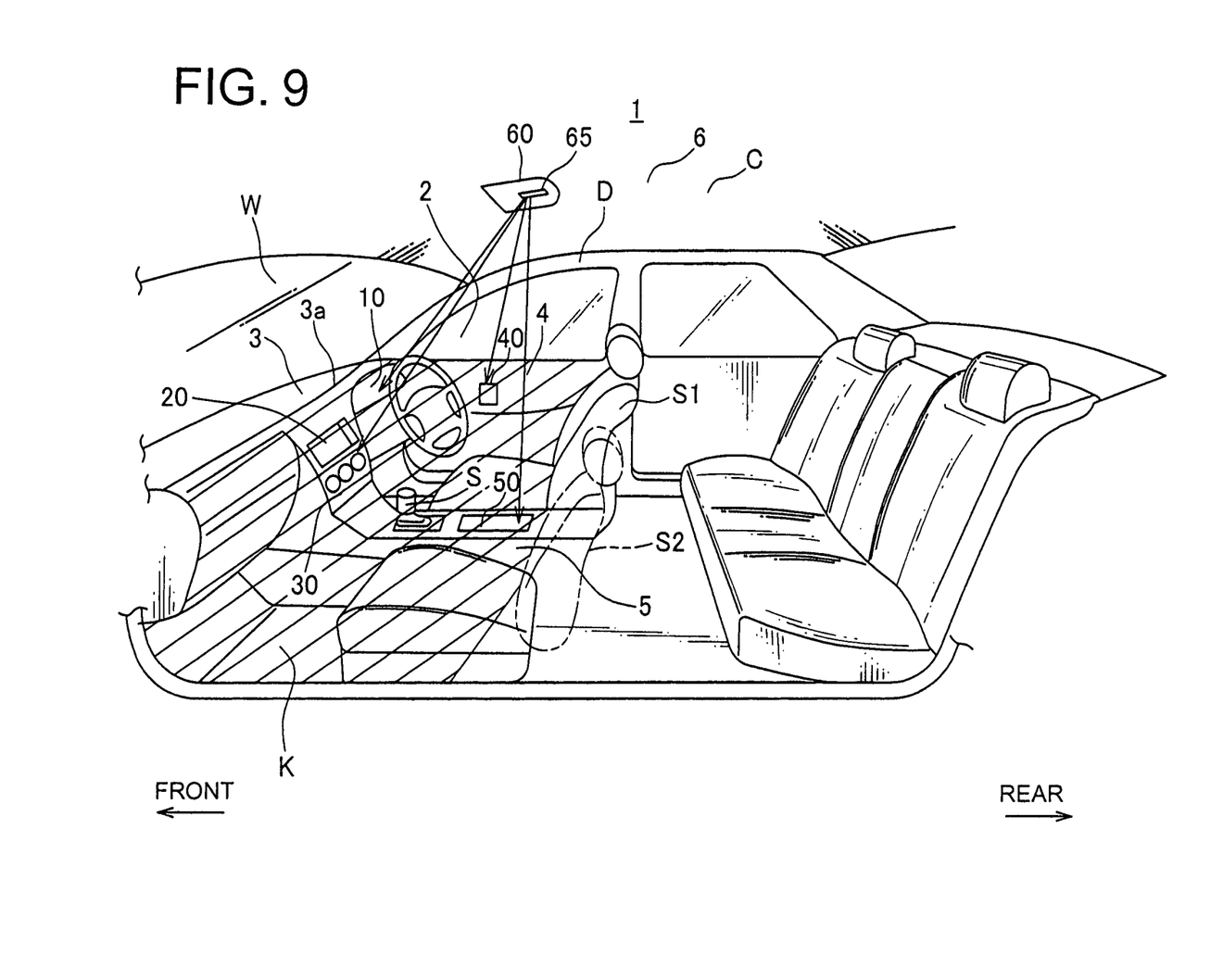
FIG. 9 is a schematic representation of an irradiated area to be irradiated by the ultraviolet light emitted by the maplamp unit illustrated in FIG. 8.

The light-guiding area 66 may be formed in a shape of a lens such that the ultraviolet light emitted by the ultraviolet LED irradiates a predetermined area, i.e., irradiation area K indicated by diagonal lines in FIG. 9. The irradiation area K is a region lower than a top end 3a of the instrument panel 3 of a front subspace of the automotive interior space 2 (here, for the sake of explanation, the automotive interior space 2 is divided into front and rear subspaces with reference to the seat backs of the driving seat S1 and the front passenger seat S2). Also, the light-guiding area 66 may have roughened surface so as to diffuse the ultraviolet light.

This construction allows the ultraviolet light to irradiate the instrument panel 3, the door interior panel 4, and the center console 5.

Figure 10:
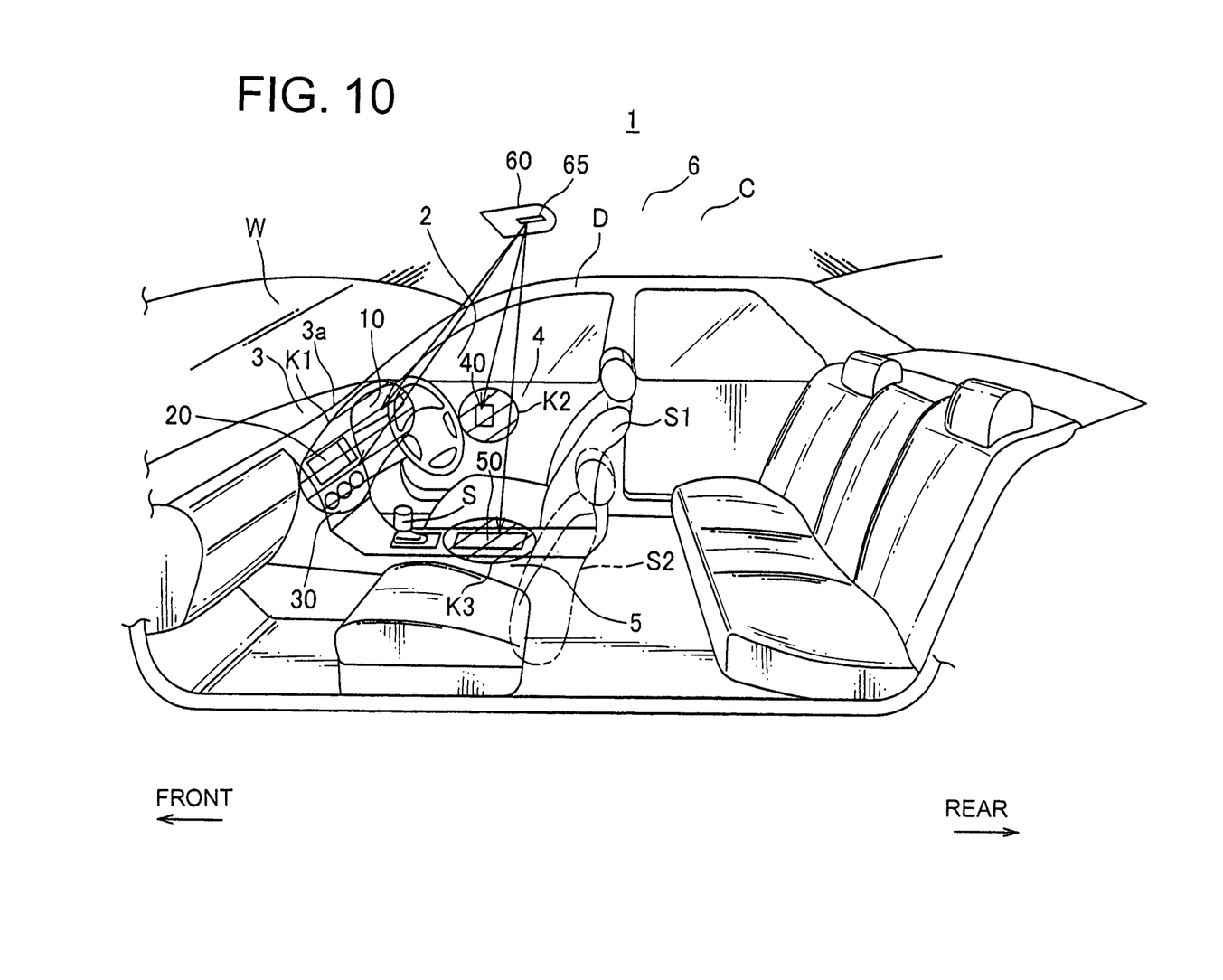
FIG. 10 is a schematic representation of another example of the irradiation area to be irradiated by the ultraviolet light emitted by the maplamp unit illustrated in FIG. 8.

Alternatively, the light-guiding area 66 may be formed such that the ultraviolet lights individually irradiate the predetermined irradiation areas K1 to K3 indicated by diagonal lines in FIG. 10, each corresponding to the instrument panel 3, the door interior panel 4, and the center console 5 (which may be called spot irradiation).

The brightness control switches 67, 68 are push-button switches adapted to control intensity (i.e., brightness) of the ultraviolet light emitted by the ultraviolet LED and are each provided in the central portion of the front cover 60a.

The brightness control switch 67 is the push-button switch with a plus (+) mark printed on its surface and used to increase the intensity of the ultraviolet light stepwise in response to being pressed by a user (i.e., the driver or the passenger). The brightness control switch 68 is the push-button switch with a minus (−) mark printed on its surface and used to decrease the intensity of the ultraviolet light stepwise in response to being pressed by the user.

It should be noted that the maplamp unit 60 is the "ultraviolet light source" in the context of the scope of the present invention.

Figure 11:
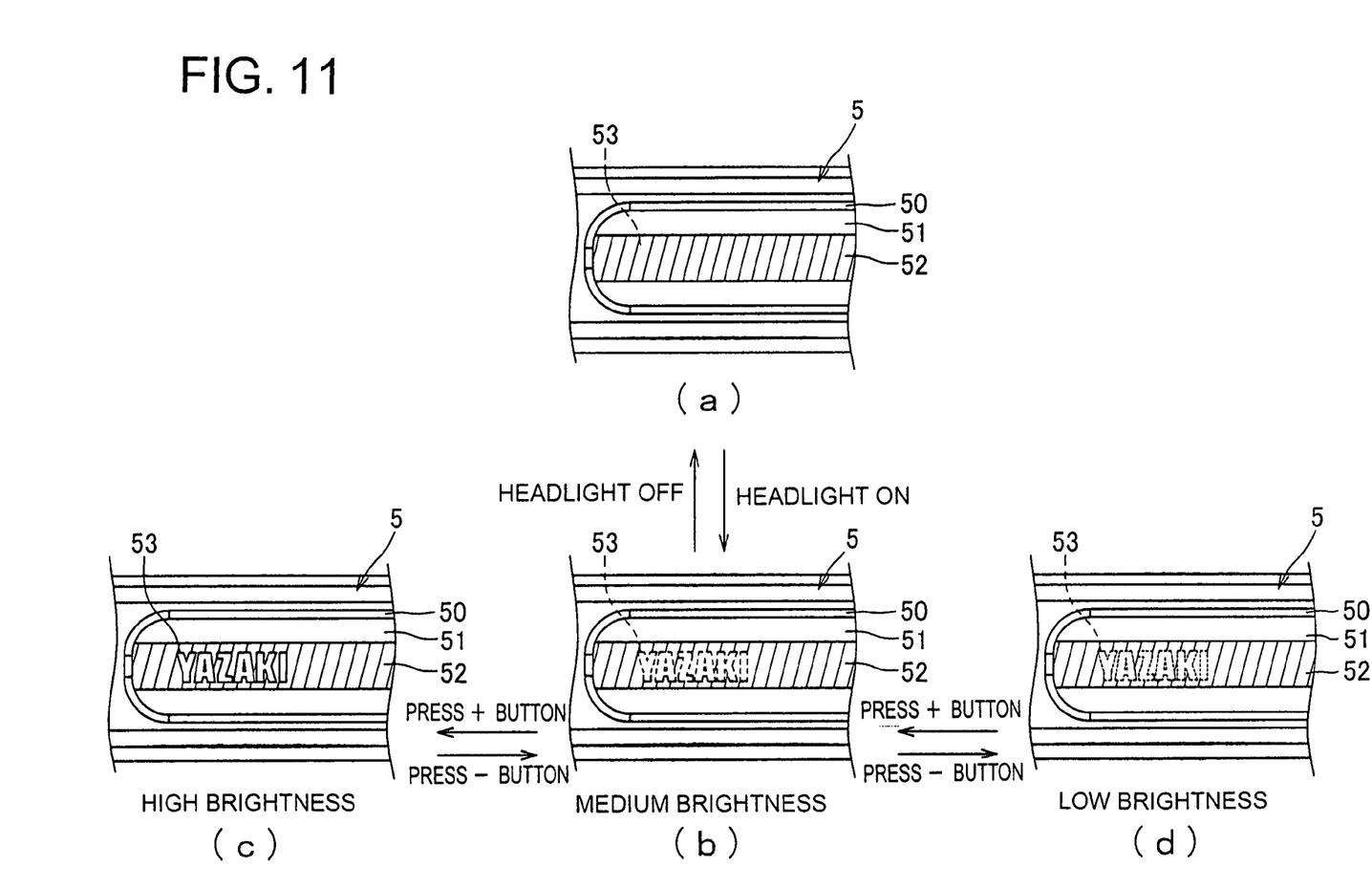
FIG. 11 is an explanatory view of transition of luminescent states of a console decoration symbol of a decoration plate provided in the small article placing area.

The following describes the operation of the light emission structure incorporated in the automotive interior space 2 of the automobile 1 according to one embodiment of the present invention with reference to FIG. 11.

Referring first to the section (a) in FIG. 11, when the headlight of the automobile 1 is turned off, the console decoration symbol 53 of the decoration plate 52 provided in the small article placing area 50 of the center console 5 will not be viewable. Meanwhile, the following items will be viewable under the visible light irradiation: (1) the indicating symbols 11C to 14c; (2) the navigation decoration symbol 21a and the navigation function symbol 23a; (3) the button function symbols 31a, 32a, and the knob function symbols 33a, 34a, 35a; and (4) the power window function symbols 41a to 45a provided in the combination meter 10, the navigation device 20, the air conditioner operating area 30, and the power window switch area 40, respectively.

When the headlight of the automobile 1 is turned on, the ultraviolet light is emitted by the ultraviolet LED provided in the maplamp unit 60 toward and upon the irradiation area K. At this point, the ultraviolet light irradiates the decoration plate 52 provided in the irradiation area K, so that the console decoration symbol 53 becomes luminous and viewable. Likewise, the ultraviolet light irradiates the combination meter 10, the navigation device 20, the air conditioner operating area 30, and the power window switch area 40 that fall within the irradiation area K, so that the following items provided therein become luminous: (1) the indicating symbols 11c to 14c; (2) the navigation decoration symbol 21a and the navigation function symbol 23a; (3) the air conditioner function symbols 31a to 35a; and (4) the power window function symbol 41a to 45a.

When the brightness control switch 67, i.e., the plus (+) button of the maplamp unit 60 is pressed, the intensity of the ultraviolet light is increased. As shown in the section (c) of FIG. 11, the brightness of the luminescent symbols is uniformly increased.

When the brightness control switch 68, i.e., the minus (−) button) is pressed, the intensity of the ultraviolet light is decreased. As shown in the section (d) of FIG. 11, the brightness of the luminescent symbols is uniformly decreased.

When the headlight is turned off, the luminescent symbols cease to be luminous and will be restored in their initial states (see the section (a) of FIG. 11).

When any other functional unit such as an on-board device or other decoration areas that includes a luminescent symbol made by fluorescent ink are to be additionally provided within the irradiation area K of the maplamp unit 60, the ultraviolet light may irradiate the luminescent symbol of the other functional unit so that it becomes luminous.

As has been described in detail in the foregoing, the present invention comprises (A) the maplamp unit 60 that emits the ultraviolet light from the roof interior panel 6 of the automotive interior space 2 of the automobile 1 toward and upon the predetermined irradiation area K, and (B) the functional units (i.e., the combination meter 10, the navigation device 20, the air conditioner operating area 30, the power window switch area 40, and the small article placing area 50) that are spaced from each other and provided within the irradiation area K, the functional units including the luminescent symbols, the luminescent symbols being adapted to become luminous when being irradiated by the ultraviolet light (the luminescent symbols including (1) the indicating symbols 11c to 14c, (2) the navigation decoration symbol 21a and the navigation function symbol 23a, (3) the air conditioner function symbols 31a to 35a, (4) the power window function symbols 41a to 45a, and (5) the console decoration symbol 53).

With the construction and arrangement summarized above, when the maplamp unit 60 emits the ultraviolet light toward and upon the irradiation area K, the luminescent symbols of the functional units falling within the irradiation area K are irradiated by the ultraviolet light to become luminous. It is therefore not necessary to provide multiple light sources on a per-functional unit basis. Also, it is possible to make the luminescent symbols of the functional units become luminous by one single maplamp unit 60 and thus reduce the number of light sources.

In addition, when a functional unit is additionally provided within the irradiation area K of the maplamp unit 60, the functional unit having the luminescent symbol that becomes luminous by being irradiated by the ultraviolet light, then it is made possible to make the luminescent symbol of the additionally provided functional unit become luminous, allowing a luminescent symbol to be readily added as long as the functional unit falls within the coverage of the irradiation area K to be irradiated by the ultraviolet light from the ceiling C (within the range that can be viewed from the ceiling C), it is possible to prevent an obstacle from intervening with the irradiation of the ultraviolet light toward the functional unit. Also, since the luminescent symbol becomes luminous by being irradiated by the ultraviolet light, the luminescent symbol will not be illuminated with a high brightness that the driver may feel is too intense, which understandably decreases driver and passenger's discomfort.

Also, since the ultraviolet light is emitted from the ceiling C, it is possible to prevent the ultraviolet light from being emitted directly to the eyes of the driver and the passenger.

Further, since the maplamp unit 60 includes the brightness control switches 67, 68 as the light-control function for controlling the irradiation intensity of the ultraviolet light, it is possible to uniformly control the brightness of the luminescent symbols of the functional units provided in the automotive interior space 2 of the automobile 1. As a result, it is not necessary to individually control the brightness of the luminescent symbols on a per-functional unit basis, facilitating the brightness control operation.

In this exemplary embodiment, the maplamp unit 60 as the ultraviolet light source in the context of the scope of the invention is configured to irradiate the ultraviolet light from the ceiling C directly toward the irradiation area K (and accordingly toward each functional unit), but the present invention is not limited to this specific configuration. For example, an ultraviolet light source that emits the ultraviolet light toward the ceiling C may be provided in the instrument panel 3 or in the center console 5 so that the ultraviolet light emitted by the ultraviolet light source is reflected on the ceiling C such that the ultraviolet light indirectly irradiates the irradiation area K.

Figure 12:
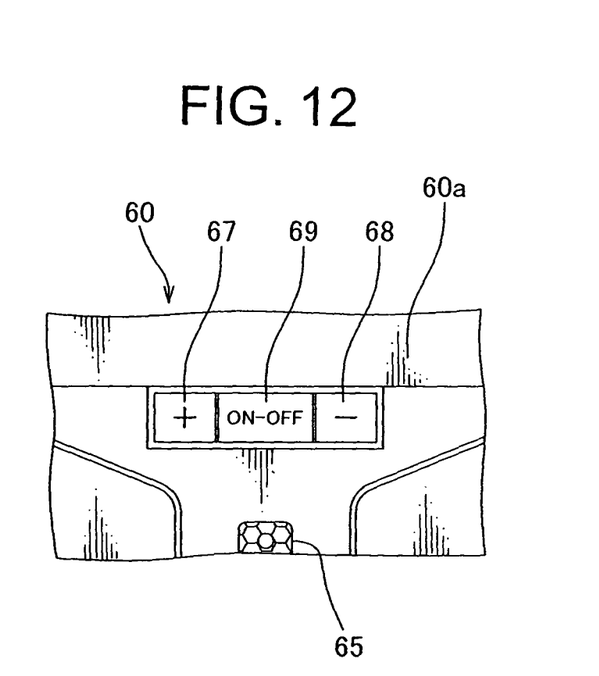
FIG. 12 is an enlarged front view of another configuration of the maplamp unit illustrated in FIG. 8.

Also, in this exemplary embodiment, the ultraviolet emitting part 65 of the maplamp unit 60 is configured to emit the ultraviolet light in response to turning on of the headlight of the automobile 1, but the present invention is not limited to this specific construction. For example, as shown in FIG. 12, an ultraviolet ON/OFF switch 69 may be provided in the maplamp unit 60 such that the ultraviolet emitting part 65 emits the ultraviolet light in response to operation of the ultraviolet ON/OFF switch 69. In this case, it should be noted that it will be necessary to provide a separate light source for each of the indicating symbols 11c to 14c provided in the above-described combination meter 10 so that these indicating symbols 11c to 14c become luminous in response to turning on of the headlight of the automobile 1.

It should be noted that the above-described embodiment is only a typical form of the present invention, to which the present invention is not limited. In other words, the present invention can be effectuated with various modifications made within a range where the scope and spirit of the present invention is not deviated from.

What is claimed is:

1. A light emission structure for an indication symbol provided in an interior space of a vehicle, comprising:
   (a) a single, sole ultraviolet light source configured to emit an ultraviolet light from a ceiling of the interior space toward and upon a plurality of irradiation areas, wherein the plurality of irradiation areas are predetermined to be irradiated by the ultraviolet light, separated and different from each other; and
   (b) a plurality of functional units provided within each irradiation area and spaced from each other, the functional units each including a luminescent symbol configured to become luminous by being irradiated by the ultraviolet light,
   wherein the single, sole ultraviolet light source has a single ultraviolet LED configured to emit the ultraviolet light having a predetermined wavelength, and a light-guiding area configured to cover the single ultraviolet LED and to pass the ultraviolet light emitted by the single ultraviolet LED, and wherein each irradiation area is an area lower than a top end of an instrument panel of a front subspace of the interior space, the interior space being divided into front and rear subspaces with reference to a seat backs of a driving seat and a front passenger seat,
   wherein the light-guiding area is formed into a shape that allows the ultraviolet light from the single ultraviolet LED individually spot-irradiate multiple different areas within the predetermined area,
   wherein the plurality of functional units are provided in a distributed arrangement on an instrument panel, a door interior panel, and a center console which are in the irradiation areas,
   wherein the light-guiding area is formed in a lens-shape and includes a roughened surface for diffusing the ultraviolet light, and
   wherein the ultraviolet light source includes a dome-like front cover having a substantially elliptical shape in plan view, and the light-guiding area of the ultraviolet light source is provided in said front cover.

2. The light emission structure according to claim 1, wherein the ultraviolet light source is formed in a shape of strip extending from a central portion of a front cover toward a rear end.

3. The light emission structure according to claim 1, wherein the ultraviolet LED is adapted to emit the ultraviolet light in response to turning on of a headlight or a road light of the vehicle.

4. The light emission structure of claim 1, wherein the plurality of light-emitting parts includes a driver-side light-emitting part and a front-passenger-side light-emitting part.

5. The light emission structure of claim 1, wherein the plurality of light-emitting parts is turned on and off in response to an operation of a switch disposed in the single ultraviolet light source.

* * * * *